C. W. Warner.

Revolving Rake.

No. 2352 Reissued Sep. 4, 1866.

WITNESSES

Geo. Coombs

Henry Adams

INVENTOR.

C. W. Warner per Munn & Co

Attorneys

UNITED STATES PATENT OFFICE.

C. W. WARNER, OF WILLISTON, VERMONT.

IMPROVEMENT IN HORSE-RAKES.

Specification forming part of Letters Patent No. 45,099, dated November 15, 1864; Reissue No. 2,352, dated September 4, 1866.

*To all whom it may concern:*

Be it known that I, C. W. WARNER, of Williston, in the county of Chittenden and State of Vermont, have invented a new and Improved Horse-Rake; and I do hereby declare that the following is a full, clear, and exact description thereof, which will enable those skilled in the art to make and use the same, reference being had to the accompanying drawings, forming part of this specification, in which—

Figure 1:
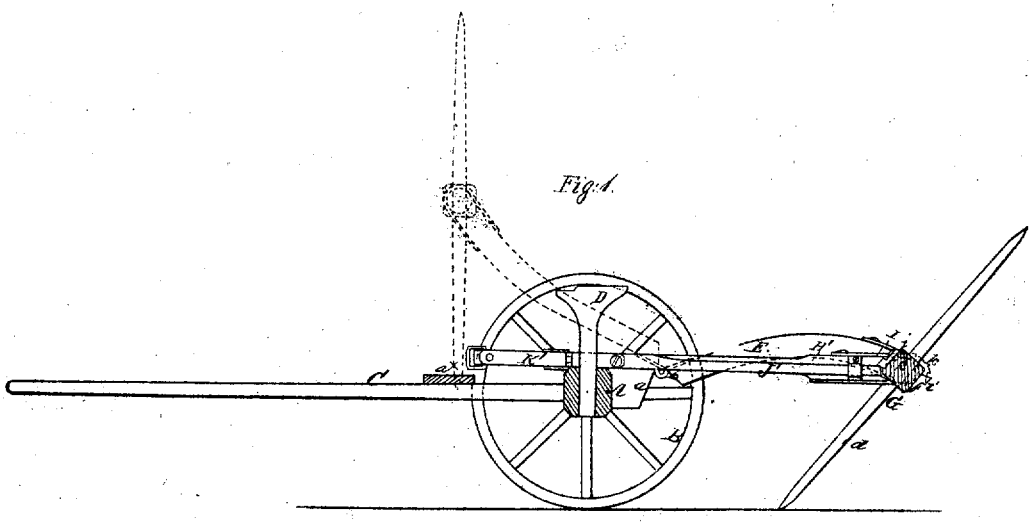
Figure 2:
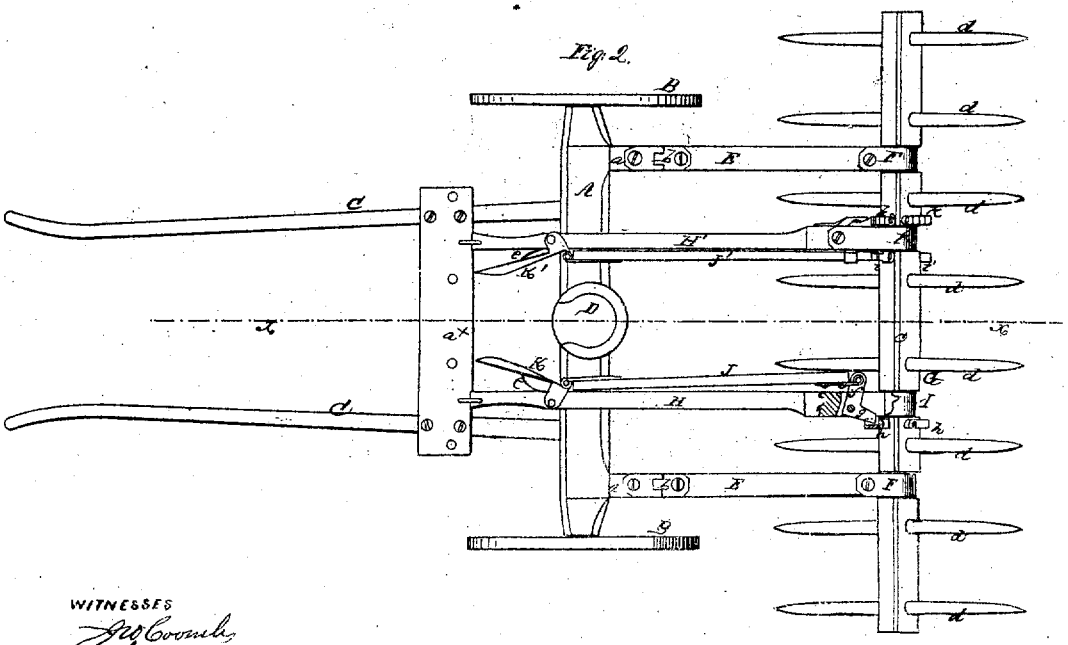

Figure 1 is a side sectional view of my invention, taken in the line *x x*, Fig. 2; Fig. 2, a plan or top view of the same.

Similar letters of reference indicate corresponding parts in the two figures.

This invention consists in attaching an ordinary revolving rake to an axle mounted on wheels and having thills attached to it, all being arranged in such a manner that the driver may ride on the machine and operate the rake with the greatest facility and the latter at the same time be capable of being adjusted or turned over on the axle for the convenience of drawing or transporting the device from place to place.

A represents an axle which has a wheel, B, at each end of it, and an ordinary pair of thills, C, attached to it, a driver's seat, D, being placed on the at its center.

To the rear side of the axle A there are attached two horizontal arms, *a a*, which project outward from the axle at right angles with it, and have each a bar, E, attached to them by a hinge, *b*. These bars E are slightly curved, as shown in Fig. 1, and to their outer ends metal straps F are attached, which encompass the head *c* of a rake, G, the head being allowed to turn freely in said straps. The hinges *b* are attached to the upper surfaces of the arms *a a* and bars E E, as shown in both figures. The teeth *d* of the rake G pass through the head *c* at right angles and project from it at equal distances at both sides, in the same way as the ordinary revolving rake.

H H′ represent two bars, the back ends of which have metal straps I I attached to them which encompass the head *c*, the latter being allowed to rotate freely in them. These bars H H′ extend forward and rest upon the axle A, and each is provided with a catch or fastening to hold the rake G in a proper working position. These catches or fastenings may be arranged in various ways, two of which are shown in Fig. 2, described as follows: The bar H is provided with a sliding rod, J, the front end of which is connected to a lever, K, having a spring, *e*, bearing against its inner side, and the back end of said rod J is connected to a bent lever, *f*, which has its fulcrum-pin *g* in the back part of the bar H. This bent lever *f* engages with notched bars *h*, which are attached to the rake-head *c* at two opposite points. By pressing the lever K inward toward the bar H the bent lever *f* will be freed from the notched bar *h*, with which it is engaged, and the rake G will be allowed to make a half-revolution, the other notched bar *h* arriving in position to receive the bent lever *f* at the time the half-revolution of the rake is completed. The other bar, H′, is provided with a lever, K′, and a sliding rod, J′, similar to those of the bar H; but instead of the notched bars *h* on the rake-head *c* simple projections *i i* are used, which come in direct contact with the back end of the rod J′ and serve to hold the rake in a proper working position. A backward movement of the rake is prevented by means of a pawl, *j*, on the bar H′ engaging with racks *k k* on the rake-head.

The levers K K′ may be operated by the driver from his seat D, and the rake allowed to rotate in order to discharge its load at any time desired. In moving or transporting the device from place to place the rake is turned over the axle, its teeth resting upon a cross-board, $a^{\times}$, at the back part of the thills, as shown in red in Fig. 1.

I would remark that the rake, instead of being placed behind the axle A, may be arranged in front thereof and in substantially the same way. The rake, it will be seen, is allowed to rise and fall to accommodate itself to the inequalities of the ground over which it passes.

By having the rake bars F attached to arms *a*, projecting from the rear of the axle, as shown, the rake may, with wheels B, of proper diameter, be turned over so as to rest upon the thill-bar $a^{\times}$ quite near the axle A, and consequently shorter thills than usual may be employed, and the rake when at work is made to operate much better than when the rake-bars are attached directly to the axle, the rake being allowed to clear obstructions with greater facility as the distance between the base of the wheels and the points of the teeth is increased without increasing the distance between the joints *b* and the rake-head.

Having thus described my invention, I wish it understood that I do not claim attaching a revolving rake-head to the axle either before or behind the same, irrespective of my peculiar plan or mode of connecting the same to the axle; but

I do claim as new and desire to secure by Letters Patent—

1. The joints or hinges *b b* on arms *a a*, projecting backward from the axle A, in combination with the rake G, all arranged as described to admit of the folding of the rake forward upon the thill-bar $a^{\times}$, substantially as set forth.

2. The method substantially as described and represented of operating the rake by means of the combination of the foot-triggers K K′, bar J, and raking-pawl *f g* with the notched bars *h* on the rake-head.

C. W. WARNER.

Witnesses:

JEREMIAH FRENCH,
JOHN FITZPATRICK.